(12) United States Patent
Yang et al.

(10) Patent No.: US 12,384,906 B2
(45) Date of Patent: Aug. 12, 2025

(54) POLYOLEFIN COMPOSITIONS HAVING IMPROVED VOLUME RESISTIVITY

(71) Applicant: Dow Global Technologies LLC, Midland, MI (US)

(72) Inventors: Yunfeng Yang, Shanghai (CN); Xiaosong Wu, Sugar Land, TX (US); Bo Lyu, Shanghai (CN); Yong Chen, Shanghai (CN); Xianmin Xu, Shanghai (CN); Tao Han, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 681 days.

(21) Appl. No.: 17/638,431

(22) PCT Filed: Aug. 30, 2019

(86) PCT No.: PCT/CN2019/103785
§ 371 (c)(1),
(2) Date: Feb. 25, 2022

(87) PCT Pub. No.: WO2021/035710
PCT Pub. Date: Mar. 4, 2021

(65) Prior Publication Data
US 2022/0298338 A1    Sep. 22, 2022

(51) Int. Cl.
*C08L 23/0807* (2025.01)

(52) U.S. Cl.
CPC ....... *C08L 23/0815* (2013.01); *C08L 2312/00* (2013.01)

(58) Field of Classification Search
CPC ... C08K 3/08; C08K 3/22; C08K 3/34; C08K 5/0025; C08K 5/005; C08K 2003/2296; C08K 5/14; C08L 2312/00
See application file for complete search history.

(56) References Cited

U.S. PATENT DOCUMENTS

2010/0087584 A1* 4/2010 Ono .................. C08L 23/10
525/139

FOREIGN PATENT DOCUMENTS

| CN | 102002194 A | 4/2011 | |
|---|---|---|---|
| CN | 106188894 A | 12/2016 | |
| CN | 106700278 A | 5/2017 | |
| CN | 107298805 A | * 10/2017 | ............ B29C 35/02 |
| CN | 107698881 A | 2/2018 | |
| JP | 2011052031 | 3/2011 | |
| JP | 2016117846 A | 6/2016 | |
| KR | 20050005009 A | 1/2005 | |
| KR | 20050005010 A | 1/2005 | |
| KR | 20050005013 A | 1/2005 | |
| KR | 20050005014 A | 1/2005 | |
| WO | 2006128646 A2 | 12/2006 | |

OTHER PUBLICATIONS

CN-107298805-A (Oct. 27, 2017) machine translaiton.*
JP 2011052031 A (Mar. 17, 2011) machine translation.*
Hattori, "EPDM Developments for Automotive Sealing Applications via Advanced Molecular Catalyst (AMC) Technology", 2017, pp. 115-120.
Krmelova, Procedia Engineering, 2016, vol. 136, p. 336-340.
Oggermuller, Gummi, Fasern, Kunststoffe, 2003, vol. 56, No. 1, p. 31-37 Abstact.
PCT/CN2019/103785, International Search Report and Written Opinion with a mailing date of May 28, 2020.
AKTISIL VM 56, Hoffmann Mineral, 2021, p. 1.
Dubcek, "Evaluation of effect of white fillers on selected properties of EPDM blend", 2016, vol. 136, p. 336-340.
Gummi, 2003, vol. 56, No. 1, p. 31-37.
PCT/CN2019/103785, International Search Report and Written Opinion dated May 28, 2022.

* cited by examiner

*Primary Examiner* — Ana L. Woodward
(74) *Attorney, Agent, or Firm* — Karen L. Beckman

(57) ABSTRACT

The present disclosure relates to a curable composition comprising: (A) a polyolefin; (B) siliceous earth; (C) a crosslinking agent; (D) a crosslinking co-agent; and, optionally, (E) an additive component, where the curable composition demonstrates improved electrical properties. The present disclosure further relates to a crosslinked polymer composition that is the reaction product of the curable composition, where improved electrical properties are demonstrated as well.

12 Claims, No Drawings

POLYOLEFIN COMPOSITIONS HAVING IMPROVED VOLUME RESISTIVITY

BACKGROUND

Good electrical properties are required for polyolefins in a variety of applications, such as wire & cable, automotive weatherstrip, hose, and electrical accessories applications. These applications require polyolefins with high volume resistivity (VR) since high VR is generally understood to help improve electrochemical degradation (ECD) resistance.

Polyolefins can be produced via different catalyst systems, such as a Ziegler-Natta (Z-N) catalyst system or a non-Ziegler-Natta (non-Z-N) catalyst system. The Z-N catalyst system is traditional technology and has low catalyst efficiency, thus requiring high loading of catalyst and a de-ashing step for purification. Non-Z-N catalyst systems have tremendously higher efficiency and does not require de-ashing, thereby significantly increasing productivity and largely reducing production costs. Beyond this, polyolefins produced via non-Z-N catalysts have a more homogenous composition and improved properties.

However, regarding electrical properties, Z-N catalyzed polyolefins may outperform non-Z-N catalyzed polyolefins. For example, regarding VR, Z-N catalyzed EPDM far outperforms EPDM produced via non-Z-N catalysts. Accordingly, there is a need for improving the VR of non-Z-N catalyzed polyolefin compositions for electrical applications so that the advantages of the non-Z-N catalyst system can be brought to such applications.

SUMMARY

In certain embodiments, the present disclosure relates to a curable composition comprising: (A) a polyolefin, (B) siliceous earth, (C) a crosslinking agent, and (D) a crosslinking co-agent. Optionally, the curable composition may further comprise (E) an additive component. The (E) additive component may comprise a metal oxide and/or an antioxidant.

In further embodiments, the present disclosure relates to a crosslinked polymer composition that is the reaction product of a curable composition comprising: (A) a polyolefin, (B) siliceous earth, (C) a crosslinking agent, (D) a crosslinking co-agent, and, optionally, (E) an additive component comprising a metal oxide and an antioxidant.

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, (whether polymerized or otherwise), unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "polymer" refers to a material prepared by reacting (i.e., polymerizing) a set of monomers, wherein the set is a homogenous (i.e., only one type) set of monomers or a heterogeneous (i.e., more than one type) set of monomers. The term polymer as used herein includes the term "homopolymer," which refers to polymers prepared from a homogenous set of monomers, and the term "interpolymer" as defined below.

The term "interpolymer" refers to a polymer prepared by the polymerization of at least two different types of monomers. This term include both "copolymers," i.e., polymers prepared from two different types of monomers, and polymers prepared from more than two different types of monomers, e.g., terpolymers, tetrapolymers, etc. This term also embraces all forms of interpolymers, such as random, block, homogeneous, heterogeneous, etc.

The term "ethylene/alpha-olefin interpolymer," as used herein, refers to a polymer that comprises, in polymerized form, a majority weight percent of ethylene (based on the weight of the interpolymer), and at least one comonomer that is an alpha-olefin. The ethylene/alpha-olefin interpolymer may be a random or block interpolymer. The terms "ethylene/alpha-olefin copolymer" and "ethylene/alpha-olefin multi-block interpolymer" are covered by the term "ethylene/alpha-olefin interpolymer."

The term "ethylene/alpha-olefin copolymer," as used herein, refers to a copolymer that comprises, in polymerized form, a majority weight percent of ethylene (based on the weight of the copolymer), and a comonomer that is an alpha-olefin, where ethylene and the alpha-olefin are the only two monomer types. The ethylene/alpha-olefin copolymer may be a random or block copolymer.

The term "ethylene/alpha-olefin multi-block interpolymer" or "olefin block copolymer," as used herein, refers to an interpolymer that includes ethylene and one or more copolymerizable alpha-olefin comonomers in polymerized form, characterized by multiple blocks or segments of two or more (preferably three or more) polymerized monomer units, the blocks or segments differing in chemical or physical properties. Specifically, this term refers to a polymer comprising two or more (preferably three or more) chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), region-regularity or region-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalyst systems. Non-limiting examples of the olefin block copolymers of the present disclosure, as well as the processes for preparing the same, are disclosed in U.S. Pat. Nos. 7,858,706 B2, 8,198,374 B2, 8,318,864 B2, 8,609,779 B2, 8,710,143 B2, 8,785,551 B2, and 9,243,090 B2, which are all incorporated herein by reference in their entirety.

The term "ethylene/alpha-olefin/diene interpolymer," as used herein, refers to a polymer that comprises, in polymerized form, ethylene, an alpha-olefin, and a diene. In one embodiment, the "ethylene/alpha olefin/diene interpolymer" comprises a majority weight percent of ethylene (based on the weight of the interpolymer).

The term "propylene/alpha-olefin interpolymer," as used herein, refers to a polymer that comprises, in polymerized form, a majority weight percent of propylene (based on the weight of the interpolymer), and at least one comonomer that is an alpha-olefin (where ethylene is considered an alpha-olefin). The propylene/alpha-olefin interpolymer may be a random or block interpolymer. The term "propylene/alpha-olefin interpolymer" includes the term "propylene/alpha-olefin copolymer."

The term "propylene/alpha-olefin copolymer," as used herein, refers to a copolymer that comprises, in polymerized form, a majority weight percent of propylene (based on the weight of the copolymer), and a comonomer that is an alpha-olefin, wherein propylene and the alpha-olefin are the only two monomer types. The propylene/alpha-olefin copolymer may be a random or block copolymer.

A "polyolefin" is a polymer produced from the polymerization of an olefin as a monomer, where an olefin monomer is a linear, branched, or cyclic compound of carbon and hydrogen having at least one double bond. Accordingly, the term "polyolefin," as used herein, includes and covers the terms "ethylene/alpha-olefin interpolymer," "ethylene/alpha-olefin copolymer," "ethylene/alpha-olefin multiblock interpolymer," "ethylene/alpha-olefin/diene interpolymer," "propylene/alpha-olefin interpolymer," and "propylene/alpha-olefin copolymer."

The term "Ziegler Natta catalyst," as used herein, refers to a vanadium-based catalyst. "Ziegler Natta catalyzed polymers" or like terms, as used herein, refer to polymers having a vanadium content that is greater than 0.4 ppm according to the methods disclosed herein or similar methods.

The term "non-Ziegler Natta catalyst," as used herein, refers to catalysts based on Group 4 metals, including those known in the art as metallocene catalysts, constrained geometry complex (CGC) catalysts, post-metallocene catalysts, molecular catalysts, and advanced molecular catalysts. "Non-Ziegler Natta catalyzed polymers" and like terms, as used herein, refer to polymers having a Group 4 metal content of 0.3 ppm or higher, according to the methods disclosed herein or similar methods. "Non-Ziegler Natta catalyzed polymers" may also have a vanadium content of less than or equal to 0.4 ppm, according to the methods disclosed herein or similar methods.

Test Methods

Each property described in the present disclosure is in accordance with the following methods.

Mooney viscosity: Mooney Viscosity is measured in a Mooney shearing disk viscometer in accordance with ASTM 1646. The instrument is an Alpha Technologies Mooney Viscometer 2000. The torque to turn the rotor at 2 rpm is measured by a torque transducer. The sample is preheated for 1 minute (min) after the platens is closed. The motor is then started and the torque is recorded for a period of 4 min. Results are reported as "ML (1+4) at 125° C." in Mooney Units (MU). The term "ML" indicates that a large rotor, "Mooney Large," is used in the viscosity test, where the large rotor is the standard size rotor. Mooney viscosity (MV) measures the resistance of polymer to flow at a relatively low shear rate and indicates the flowability of the polymer.

Density: Density is measured in accordance with ASTM D792, Method B. The result is recorded in grams per cubic centimeter (g/cc or g/cm$^3$).

Monomer content: Ethylene content and propylene content of the interpolymers, as weight percentage, is determined by Fourier Transform Infrared (FTIR) analysis in accordance with ASTM D3900. Diene (ENB) content of the interpolymers as a weight percentage is determined by Fourier Transform Infrared (FTIR) analysis in accordance with ASTM D6047.

Residual elemental analysis: Residual elemental analysis to determine metal content of the interpolymer (e.g., vanadium content, Group 4 metal content, titanium content, hafnium content, and/or zirconium content) is performed using Inductively Coupled Plasma-Atomic Emission Spectroscopy (ICP-AES) techniques. For ICP-AES analysis, the samples are weighed into quartz tubes and 1 mL water and 3 mL nitric acid are added to the samples. The samples are placed in a hot block at 115° C. for 30 minutes. The samples are then placed in an UltraWave Microwave oven where they are digested at 250° C. After digestion in the microwave, the samples are diluted and analyzed by a Perkin Elmer ICP for aluminum, calcium, chromium titanium and vanadium. Results are reported in parts per million (ppm).

Gel Permeation Chromatography ("GPC"): The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left(\frac{(RV_{PeakMax})}{\text{Peak Width at } \frac{1}{2} \text{ height}}\right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ4)$$

$$Mw_{(GPC)} = \frac{\sum_i (IR_i * M_{polyethylene_i})}{\sum_i IR_i} \quad (EQ5)$$

$$Mz_{(GPC)} = \frac{\sum_i (IR_i * M_{polyethylene_i}^2)}{\sum_i (IR_i * M_{polyethylene_i})} \quad (EQ6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−1% of the nominal flowrate.

$$\text{Flowrate(effective)}=\text{Flowrate(nominal)}*(RV(FM\ Calibrated)/RV(FM\ Sample)) \quad (EQ7)$$

Moving Die Rheometer (MDR): Cure properties at 180° C. were measured using a Prescott Rheo-line MDR following ASTM D5289-15. The torque vs. the time curve for each sample was recorded over the given interval. The maximum torque exerted by the MDR during a 25 minute testing interval (MH) is recorded in deci-Newton meters (dNm). The MH typically corresponds to the maximum torque exerted at 25 minutes. The time it takes for the torque to reach x % of MH ($t_x$) is recorded in minutes. $t_x$ is a standardized measurement to understand the curing kinetics of each resin. The time to reach 90% of MH ($t_{90}$) is recorded in minutes.

Volume Resistivity: The volume resistivity is determined by the following method which is based on ASTM D257. The volume resistivity is determined using a Keithley 6517 B electrometer, combined with the Keithley 8009 test fixture. The Keithley model 8009 test chamber is located inside the forced air oven which is capable of operating at elevated temperatures (maximum temperature 80° C.). The leakage current is recorded from the instrument via software and the following equation is used to calculate the volume resistivity (VR):

$$\rho = \frac{V \times A}{I \times t}$$

wherein $\rho$ is the volume resistivity in ohm·cm, V is the applied voltage in volts, A is the electrode contact area in $cm^2$, I is the leakage current in amps recorded after 10 minutes of applied voltage, and t is the thickness of the sample. The thickness of the compression molded film is measured before the test. Five points of the film are measured to get the average thickness, which is used in the calculation. The test is conducted at 500 volts at room temperature. Two compression molded films are tested and the recorded VR is the average of the two tests. Results are reported in ohm-centimeters (ohm·cm).

DETAILED DESCRIPTION

Polyolefin

The (A) polyolefin of the present disclosure may be any interpolymer in which an olefin is the primary monomer. That is, the polyolefin may be an interpolymer comprising a majority amount of polymerized units derived from an olefin monomer, wherein the interpolymer further comprises units derived from a comonomer that is a different from the olefin monomer and is a C2-C30 linear, branched or cyclic alpha-olefin. For purposes of this disclosure, ethylene is an alpha-olefin. Non-limiting examples of C2-C30 alpha-olefins for use as comonomers include ethylene, propylene, 1-butene, 4-methyl-1-pentene, 1-hexene, 1-octene, 1-decene, 1-dodecene, 1-tetradecene, 1-hexadecene, and 1-octadecene.

In certain embodiments, the polyolefin is an ethylene/alpha-olefin interpolymer. Non-limiting examples of ethylene/alpha-olefin interpolymers include interpolymers of ethylene and C3-C8 alpha-olefins, or C4-C8 alpha-olefins, such as ethylene/propylene interpolymers, ethylene/1-butene interpolymers, ethylene/1-hexene interpolymers, ethylene/1-octene interpolymers, and combinations thereof.

In certain embodiments, the polyolefin is an ethylene/alpha-olefin copolymer. Non-limiting examples of ethylene/alpha-olefin copolymers include copolymers of ethylene and C3-C8 alpha-olefins, or C4-C8 alpha-olefins, such as ethylene/propylene copolymers, ethylene/1-butene copolymers, ethylene/1-hexene copolymers, ethylene/1-octene copolymers, and combinations thereof.

In certain embodiments, the polyolefin is an ethylene/alpha-olefin/diene interpolymer, as further discussed below.

In further embodiments, the polyolefin is an ethylene/alpha-olefin multi-block interpolymer or olefin block copolymer as defined herein.

In certain embodiments, the polyolefin is a propylene/alpha-olefin interpolymer. Non-limiting examples of propylene/alpha-olefin interpolymers include propylene/ethylene interpolymers, propylene/1-butene interpolymers, propylene/1-hexene interpolymers, propylene/1-octene interpolymers, and combinations thereof. In further embodiments, the polyolefin is a propylene/alpha-olefin copolymer. Non-limiting examples of propylene/alpha-olefin copolymers include propylene/ethylene copolymers, propylene/1-butene copolymers, propylene/1-hexene copolymers, propylene/1-octene copolymers, and combinations thereof.

In certain embodiments, the polyolefin is absent a heteroatom. The term "heteroatom," as used herein, is an atom other than carbon or hydrogen. The heteroatom can be a non-carbon atom from Groups IV, V, VI and VII of the Periodic Table. Non-limiting examples of heteroatoms include: F, N, O, P, B, S, and Si.

In certain embodiments, the polyolefin has a vanadium content of (or comprises vanadium in an amount of) less than or equal to 0.4 ppm or less than or equal to 0.3 ppm, in accordance with the methods disclosed herein or similar methods. In further embodiments, the polyolefin has a Group 4 metal content (or comprises a Group 4 metal in an amount of) greater than or equal to 0.3 ppm, or greater than or equal to 0.4 ppm, or greater than or equal to 0.5 ppm, or greater than or equal to 0.6 ppm, in accordance with the methods disclosed herein or similar methods. In further embodiments, the polyolefin has a vanadium content of (or comprises vanadium in an amount of) less than or equal to 0.4 ppm or less than or equal to 0.3 ppm and/or a Group 4 metal content (or comprises a Group 4 metal in an amount of) greater than or equal to 0.3 ppm, or greater than or equal to 0.4 ppm, or greater than or equal to 0.5 ppm, or greater than or equal to 0.6 ppm.

In further embodiments, the polyolefin has one, some, or all of the following: a Mooney viscosity (ML 1+4 at 125° C.) from greater than zero to 100 MU, or from 5 to 100 MU, in accordance with ASTM D1646; a density from 0.850 g/cc to 0.920 g/cc, in accordance with ASTM D792, Method B; from 40 wt % to 80 wt %, or from 50 wt % to 80 wt %, of polymerized ethylene; from zero to 10 wt % of polymerized diene; and a molecular weight distribution (MWD or Mw/Mn) from 1 to 7, or from 1 to 5, or from 2 to 4.

Suitable polyolefins include but are not limited to those available under the tradenames NORDEL™, ENGAGE™, INFUSE™, and VERSIFY™ from The Dow Chemical Company, Exact™ and Vistamaxx™ from ExxonMobil Chemical Company, and LUCENE™ from LG Chemical.

The polyolefin may have any combination of embodiments described herein.

Ethylene/Alpha-Olefin/Diene Interpolymer

In embodiments where the (A) polyolefin of the present disclosure is an ethylene/alpha-olefin/diene interpolymer, the ethylene/alpha-olefin/diene interpolymer comprises, in polymerized form, ethylene, an alpha-olefin, and a diene. The diene may be conjugated or non-conjugated. Suitable examples of alpha-olefins include C3-C20 alpha-olefins or C3-C10 alpha-olefins. Suitable examples of dienes include C4-C40 non-conjugated dienes.

The alpha-olefin may be either an aliphatic or aromatic compound. In some embodiments, the alpha-olefin is a C3-C10 aliphatic alpha-olefin. In some embodiments, the alpha-olefin is selected from the group consisting of propylene, 1-butene, 1-hexene and 1-octene. In certain embodiments, the alpha-olefin is propylene.

In certain embodiments, the diene is a non-conjugated diene that is acyclic or cyclic. Non-limiting examples of non-conjugated dienes include straight chain acyclic dienes, such as 1,4-hexadiene, 1,5-heptadiene, and 1,9-decadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene and methyl tetrahydroindene; alkenyl, alkylidene, cycloalkenyl and cycloalkylidene norbornenes, such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In further embodiments, the diene is a non-conjugated diene selected from the group consisting of ENB, dicyclopentadiene, 1,4-hexadiene, and 7-methyl-1,6-octadiene. In further embodiments, the diene is ENB.

In some embodiments, the ethylene/alpha-olefin/diene interpolymer is an ethylene/propylene/diene (EPDM) interpolymer. In further embodiments, the ethylene/alpha-olefin/diene interpolymer is an ethylene/propylene/diene (EPDM) interpolymer, wherein the diene is ENB.

In some embodiments, the ethylene/alpha-olefin/diene interpolymer is prepared with a non-Ziegler Natta catalyst, such as a CGC catalyst, an advanced molecular catalyst, or a post-metallocene catalyst. Examples of such catalysts include but are not limited to those disclosed in U.S. Pat. Nos. 5,272,236; 5,278,272; and 8,101,696, and the publications US 2005/0164872 and WO 2007/136494, each fully incorporated herein by reference.

In some embodiments, the ethylene/alpha-olefin/diene interpolymer has a Mooney viscosity (ML 1+4 at 125° C.) from greater than 0 to 100 MU, or from 5 to 100 MU, in accordance with ASTM D1646. In certain embodiments, the ethylene/alpha-olefin/diene interpolymer has a Mooney viscosity (ML 1+4 at 125° C.) from 5 MU, or 10 MU, 15 MU, or 18 MU, or 20 MU, or 25 MU, or 30 MU, or 35 MU to 40 MU, or 45 MU, or 50 MU, or 55 MU, or 60 MU, or 65 MU, or 70 MU, or 75 MU, or 80 MU, or 85 MU, or 90 MU, or 99 MU, or 100 MU, in accordance with ASTM D1646.

In further embodiments, the ethylene/alpha-olefin/diene interpolymer has, in accordance with ASTM D1646, a Mooney viscosity (ML 1+4 at 125° C.) from greater than 0 to 100 MU, or from 5 MU to 100 MU, or from 15 MU to 100 MU, or from 15 MU to 99 MU, or from 15 MU to 90 MU, or from 15 MU to 80 MU, or from 15 MU to 70 MU or from 15 MU to 60 MU, or from 15 MU to 50 MU, or from 18 MU to 45 MU, or from 18 MU to 40 MU.

In certain embodiments, the ethylene/alpha-olefin/diene interpolymer has, in accordance with ASTM D792, Method B, a density from 0.850 g/cc, or 0.860 g/cc, or 0.870 g/cc to 0.880 g/cc, or 0.890 g/cc, or 0.900 g/cc, or 0.910 g/cc, or 0.920 g/cc. In further embodiments, the ethylene/alpha-olefin/diene interpolymer has, in accordance with ASTM D792, Method B, a density from 0.850 g/cc to 0.920 g/cc, or from 0.860 g/cc to 0.910 g/cc, or from 0.860 g/cc to 0.900 g/cc, or from 0.860 g/cc to 0.890 g/cc, or from 0.860 g/cc to 0.880 g/cc.

In some embodiments, the ethylene/alpha-olefin/diene interpolymer comprises a majority amount of polymerized ethylene, based on the weight of the interpolymer. In certain embodiments, the ethylene/alpha-olefin/diene interpolymer comprises from 40 wt %, or 45 wt %, or 50 wt %, or 55 wt %, or 60 wt %, or 68 wt % to 70 wt %, or 71 wt %, or 75 wt %, or 80 wt %, or 85 wt % of polymerized ethylene. In further embodiments, the ethylene/alpha-olefin/diene interpolymer comprises from 40 to 80 wt %, or from 50 to 80 wt % or from 55 to 70 wt % of polymerized ethylene.

In certain embodiments, the ethylene/alpha-olefin/diene interpolymer comprises from greater than 0 wt %, or 0.5 wt %, or 1 wt %, or 2 wt %, or 3 wt %, or 3.5 wt %, or 4 wt %, or 4.5 wt %, or 4.7 wt % to 4.9 wt %, or 5 wt %, or 6 wt %, or 7 wt %, or 7.5 wt %, or 8 wt %, or 8.5 wt %, or 9 wt %, or 10 wt % of polymerized diene, based on the weight of the interpolymer. In further embodiments, the ethylene/alpha-olefin/diene interpolymer comprises from greater than zero to 10 wt %, or from 0.5 wt % to 9 wt %, or from 0.5 wt % to 8.5 wt % of polymerized diene, such as polymerized ENB.

In some embodiments, the ethylene/alpha-olefin/diene interpolymer has a molecular weight distribution (MWD or Mw/Mn) from 1 to 7, or from 1 to 5, or from 1.5 to 5, or from 2 to 4.

The ethylene/alpha-olefin/diene interpolymer may have the following metals content in accordance with the methods disclosed herein or similar methods. In certain embodiments, the ethylene/alpha-olefin/diene interpolymer has a vanadium content of, or comprises vanadium in an amount of, less than or equal to 0.4 ppm, or less than or equal to 0.3 ppm.

In certain embodiments, the ethylene/alpha-olefin/diene interpolymer has a titanium content of, or comprises titanium in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a zirconium content of, or comprises zirconium in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a hafnium content of, or comprises hafnium in an amount of, greater than or equal to 0.3 ppm, or greater than or equal to 0.4 ppm, or greater than or equal to 0.5 ppm.

In certain embodiments, the ethylene/alpha-olefin/diene interpolymer has a Group 4 metal content of, or comprises a Group 4 metal in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer comprises titanium, zirconium, and/or hafnium in an amount of greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a vanadium content of less than or equal to 0.4 ppm or less than or equal to 0.3 ppm or a Group 4 metal content of greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer is absent a heteroatom. The term "heteroatom," as used herein, is an atom other than carbon or hydrogen. The heteroatom can be a non-carbon atom from Groups IV, V, VI and VII of the Periodic Table. Non-limiting examples of heteroatoms include: F, N, O, P, B, S, and Si.

The ethylene/alpha-olefin/diene interpolymer of the present disclosure may comprise two or more embodiments as described herein or may be any combination of embodiments described herein.

Siliceous Earth

The curable composition of the present disclosure further comprises (B) siliceous earth. In certain embodiments, the siliceous earth of the present disclosure is classic Neuburg Siliceous Earth, a natural combination of corpuscular Neuburg silica and lamellar kaolinite: a loose mixture impossible to separate by physical methods.

In further embodiments, the siliceous earth of the present disclosure is classic Neuburg Siliceous Earth having a particle size distribution (D50) from 1.5 to 4, based on the Fraunhofer analysis of diffraction spectra performed with a Matersizer 3000, a laser device from Malvern Instruments.

In certain embodiments, the siliceous earth of the present disclosure is classic Neuburg Siliceous Earth available from the Hoffman Mineral GmbH under the name Sillitin. In certain embodiments, the siliceous earth of the present disclosure is classic Neuburg Siliceous Earth available as Sillitin N 85 or Sillitin Z 86 from Hoffman Mineral GmbH.

The siliceous earth may be a blend of two or more classic Neuburg Siliceous Earth. The siliceous earth may be any combination of embodiments disclosed herein.

Crosslinking Agent

The curable composition of the present disclosure may be cured to form a crosslinked polymer composition. The crosslinked polymer composition is the reaction product of the curable composition that results from curing. Accordingly, in certain embodiments, the curable composition further comprises (C) a crosslinking agent.

Non-limiting examples of suitable crosslinking agents include peroxides; phenols; azides; aldehyde-amine reaction products; substituted ureas; substituted guanidines; substituted xanthates; substituted dithiocarbamates; sulfur-containing compounds, such as thiazoles, sulfenamides, thiuramidisulfides, paraquinonedioxime, dibenzoparaquinonedioxime, sulfur; imidazoles; silanes; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups and combinations thereof.

Suitable crosslinking agents include those that are sulfur based, such as elemental sulfur. When sulfur based curing agents are employed, accelerators and cure activators may be used as well, such as amines, disulfides, guanidines, thioureas, thiazoles, thiurams, sulfenamides, dithiocarbamates, xanthates, 4,4'-dithiodimorpholine, thiuram di- and polysulfides, alkylphenol disulfides, and 2-morpholino-dithiobenzothiazole, tetramethylthiuram disulfide (TMTD), dipentamethylenethiuram tetrasulfide (DPTT), 2-mercaptobenzothiazole (MBT), 2-mercaptobenzothiazolate disulfide (MBTS), zinc-2-mercaptobenozothiazolate (ZMBT), zinc diethyldithiocarbamatezinc (ZDEC), zinc dibutyldithiocarbamate (ZDBC), dipentamethylenethiuram tetrasulfide (DPTT), N-t-butylbenzothiazole-2-sulfanamide (TBBS), and mixtures thereof.

Additional crosslinking agents include, but are not limited to, phenolic resins, azides, aldehyde-amine reaction products, vinyl silanes, hydrosilylation agents, substituted ureas, substituted guanidines, substituted xanthates, substituted dithiocarbamates, and combinations thereof. The crosslinking agent may be a phenolic curing agent or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"). Popular industrial catalysts are "Speier's catalyst," H2PtCl6, and Karstedt's catalyst, an alkene-stabilized platinum(0) catalyst.

In preferred embodiments, the crosslinking agent may be one or more organic peroxides including but not limited to alkyl peroxides, aryl peroxides, peroxyesters, peroxycarbonates, diacylperoxides, peroxyketals, cyclic peroxides, dialkyl peroxides, peroxy esters, peroxy dicarbonates, or combinations of two or more thereof. Examples of peroxides include but are not limited to di-tertbutyl peroxide, dicumyl peroxide, di(3,3,5-trimethyl hexanoyl)peroxide, t-butyl peroxypivalate, t-butyl peroxyneodecanoate, di(sec-butyl)peroxydicarbonate, t-amyl peroxyneodecanoate, 1,1-di-t-butyl peroxy-3,3,5-trimethylcyclohexane, t-butyl-cumyl peroxide, 2,5-dimethyl-2,5-di(tertiary-butyl-peroxyl)hexane, 1,3-bis(tertiary-butyl-peroxyl-isopropyl)benzene, or a combination thereof. An exemplary crosslinking agent is dicumyl peroxide commercially available under the tradename LUPEROX® from Arkema or the tradename TRIGONOX® from Akzo Nobel. A further exemplary crosslinking agent is VAROX® DBPH-50 from Vanderbilt Chemicals. When the crosslinking agent is a peroxide, certain processing aids and cure activators such as stearic acid and ZnO may also be used.

Further examples of suitable organic peroxides include but are not limited to dicumyl peroxide; lauryl peroxide; benzoyl peroxide; tertiary butyl perbenzoate; di(tertiary-butyl) peroxide; cumene hydroperoxide; 2,5-dimethyl-2,5-di(t-butyl-peroxy)hexyne-3; 2-5-di-methyl-2,5-di(t-butyl-peroxy)hexane; tertiary butyl hydroperoxide; isopropyl percarbonate; alpha,alpha'-bis(tertiary-butylperoxy)diisopropylbenzene; t-butylperoxy-2-ethylhexyl-monocarbonate; 1,1-bis(t-butylperoxy)-3,5,5-trimethyl cyclohexane; 2,5-dimethyl-2,5-dihydroxyperoxide; t-butylcumylperoxide; alpha,alpha'-bis(t-butylperoxy)-p-diisopropyl benzene; bis (1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(tbutylperoxy)-2,5-dimethylhexane; 2,5-bis(t-butylperoxy)-2,5-dimethylhexyne-3, 1,1-bis(tbutylperoxy)-3,3,5-trimethylcyclohexane; 2,5-di(t-amyl peroxy)-2,5-dimethylhexane; isopropylcumyl cumylperoxide; butyl 4,4-di(tertbutylperoxy) valerate; di(isopropylcumyl) peroxide; 2,5-di-(t-butylperoxy)-2,5-diphenylhexane; bis(alpha-methylbenzyl)peroxide; benzoyl peroxide; t-butyl perbenzoate; 3,6,9-triethyl-3,6,9-trimethyl-1,4,7-triperoxonane; bis(t-butylperoxy)-diisopropylbenzene; di-2-t-butylperoxy isopropyl benzene; and combinations thereof.

Non-limiting examples of suitable commercially available organic peroxides include those available from AkzoNobel under the tradename TRIGONOX®, and those available from Arkema under the tradename LUPEROX®, such as LUPEROX® F40P.

As further discussed below, when peroxide based curing agents are used, co-activators or co-agents may be used in combination therewith. Suitable coagents include but are not limited to trimethylolpropane triacrylate (TMPTA), trimethylolpropane trimethacrylate (TMPTMA), triallyl cyanurate (TAC), triallyl isocyanurate (TAIC), and 1,4-phenylenedimaleimide (available from TCI Chemicals).

When a crosslinking agent is used, the cross-linking can be induced by activating the cross-linking agent in the curable composition. The crosslinking agent can be activated by exposing it to a temperature above its decomposition temperature. Temperatures range from 50° C. to 300° C., such as 80° C. to 275° C. Time can be determined by one of ordinary skill in the art depending on polymers and cure components selected.

Alternatively, the crosslinking agent can be activated by exposing it to a radiation that causes the generation of free radicals from the crosslinking agent. Non-limiting examples of suitable radiation include UV or visible radiation, electron beam or beta ray, gamma rays, X-rays, or neutron rays. Radiation is believed to activate the cross-linking by generating radicals in the polymer which may subsequently combine and cross-link. Radiation dosage depends upon many factors and can be determined by those skilled in the art. UV or visible radiation activation can occur when the cross-linking agent is a peroxide photoinitiator, such as dibenzoyl peroxide, cumene hydroperoxide, di-t-butyl peroxide, diacetyl peroxide, hydrogen peroxide, peroxydisulfates, and 2,2-bis(terbutylperoxy)-2,5-dimethylhexane.

In some embodiments, dual cure systems, which comprises at least two activation methods, may be effectively employed, such as combinations selected from heat, moisture cure, and radiation. For instance, it may be desirable to employ a peroxide crosslinking agent in conjunction with a silane crosslinking agent, a peroxide crosslinking agent in conjunction with radiation, a sulfur-containing cross-linking agent in conjunction with a silane crosslinking agent, or the like. Those skilled in the art will be readily able to select the amount of crosslinking agent, based on the desired crosslinking level, the characteristics of the polymer such as molecular weight, molecular weight distribution, comonomer content, the presence of cross-linking enhancing coagents, other additives and the like.

Crosslinking Co-Agent

In certain embodiments wherein the curable composition of the present disclosure comprises a peroxide crosslinking agent, the curable composition may further comprise (D) a crosslinking co-agent. The crosslinking co-agent can be any one, or a mixture, of co-agents, including, but not limited to, an ester, ether, ketone, cyanurate, isocyanurate, phosphate, ortho formate, aliphatic or aromatic ether containing at least 2, and preferably 3, unsaturated groups such as allyl, vinyl or acrylate. The number of carbon atoms in the co-agent can be in the range of 9 to 40 or more, and is preferably 9 to 20.

Specific examples of co-agents include, but are not limited to, trimethylolpropane trimethacrylate (TRIM); triallyl cyanurate (TAC); triallyl-1,3,5-triazine-2,4,6(1H,3H,5H)-trione also known as triallyl isocyanurate (TAIC); hexaallyl melamine; triallyl phosphate (TAP); triallyl ortho formate; tetra-allyloxy-ethane; triallyl benzene-1,3,5-tricarboxylate; diallyl phthalate; diallyl terephthalate; zinc dimethacrylate; ethoxylated bisphenol A dimethacrylate; methacrylate terminated monomer with average chain length of C14 or C15; pentaerythritol tetraacrylate; depentaerythritol pentaacrylate; pentaerythritol triacrylate; dimethylolpropane tetraacrylate; ethoxylated trimethylolpropane triacrylate; trimethylolpropane triacrylate; 2,4,6-triallyl-1,3,5-trione; 2,4-dipentyl-4-methyl-1-pentene; triallyl trimellitate (TATM); 3,9-divinyl-2,4,8,10-tetra-oxaspiro[5.5]undecane (DVS); alphamethyl styrene dimer (AMSD); 1,2 polybutadiene; divinyl benzene; trimethylolpropane trimethacrylate; polyethylene glycol dimethacrylate; ethylene glycol dimethacrylate; allyl methacrylate; N N'-m-phenylene bismaleimide; toluene bismaleimide-p-quinone dioxime; nitrobenzene; diphenylguanidine; and combinations thereof.

In certain embodiments, the crosslinking co-agent may be selected from the group consisting of TRIM, TAIC, TAC, TAP, vinyl cyclic siloxanes, and combinations thereof.

Additive Component

The compositions of the present disclosure may comprise one or more additives. Accordingly, the curable composition and crosslinked polymer composition of the present disclosure may comprise (E) an additive component. Suitable additives that may comprise the additive component include but are not limited to metal oxides, antioxidants, fillers, UV stabilizers, flame retardants, plasticizers or oils, colorants or pigments, tackifiers, reinforcing agents, fatty acids and salts thereof, ignition resistant additives, scorch inhibitors, stabilizers, blowing agents, lubricants, processing aids, extrusion aids, nucleating agents, scavengers, waxes, curing additives, accelerants, and combinations thereof.

Metal oxides include but are not limited to oxides of silicon, calcium, zinc, iron, titanium, and aluminum. Fillers include, but are not limited to, carbon black; silicates of aluminum, magnesium, calcium, sodium, potassium and mixtures thereof; carbonates of calcium, magnesium and mixtures thereof; sulfates of calcium, barium, and lead; alumina trihydrate; magnesium hydroxide; phenol-formaldehyde, polystyrene, and poly(alphamethyl)-styrene resins, natural fibers, synthetic fibers, and the like.

Plasticizers or oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumaroneindene resins; pine tars; vegetable oils, such as castor, tall, rapeseed, and soybean oils and esters and epoxidized derivatives thereof; and the like.

Antioxidants and antiozonants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, 2,2,4-trimethyl-1,2-dihydroquinoline, and the like.

UV stabilizers include but are not limited to hindered phenols, phosphites, hindered amine light stabilizers (HALS), UV absorbers, hindered benzoates, and combinations of these. Suitable UV stabilizers include but are not limited to T770 available from TCI; UV 531 available from TCI; Cynergy A400, A430 and R350; Cyasorb UV-3529; Cyasorb UV-3346; Cyasorb UV-3583; Hostavin N30; Univil 4050; Univin 5050; Chimassorb UV-119; Chimassorb 944 LD; Tinuvin 622 LD; benzophenones, benzotriazoles, triazines, and combinations of these, such as Tinuvin 328 or Cyasorb UV-1164; and the like.

In certain embodiments, the (E) additive component comprises a metal oxide and an antioxidant.

Curable Composition

The present disclosure relates to a curable composition comprising: (A) a polyolefin; (B) siliceous earth; (C) a crosslinking agent; (D) a crosslinking co-agent; and, optionally, (E) an additive component. The (E) additive component may comprise an antioxidant and a metal oxide.

The (A) polyolefin may be present in the curable composition in an amount from 30 wt % to 95 wt %, or from 40 wt % to 95 wt %, or from 50 wt % to 85 wt %, or from 55 wt % to 75 wt %, based on the total weight of the curable composition.

The (B) siliceous earth may be present in the curable composition in an amount from 0.1 wt % to 55 wt %, or from 1 wt % to 50 wt %, or from 10 wt % to 40 wt %, or from 15 wt % to 35 wt %, or from 20 wt % to 35 wt %, based on the total weight of the curable composition.

The (C) crosslinking agent may be present in the curable composition in an amount from 0.01 wt % to 10 wt %, or from 0.1 wt % to 10 wt %, or from 0.5 wt % to 8 wt %, or from 1 wt % to 5 wt %, or from 2 wt % to 4 wt %, based on the total weight of the curable composition.

The (D) crosslinking co-agent may be present in the curable composition in an amount from 0.01 wt % to 5 wt %, or from 0.05 wt % to 3 wt %, or from 0.1 wt % to 1 wt %, based on the total weight of the curable composition.

The (E) additive component may be present in the curable composition in an amount from 0 wt % to 20 wt %, or from 0.01 wt % to 20 wt %, or from 0.01 wt % to 15 wt %, or from 0.01 wt % to 10 wt %, or from 0.1 wt % to 10 wt %, or from 1 wt % to 10 wt %, or from 1 wt % to 8 wt %, or from 2 wt % to 6 wt %, based on the total weight of the curable composition.

In certain embodiments, the ratio of the (A) polyolefin to the (B) siliceous earth in the curable composition is from 100:5 to 100:120 or from 100:20 to 100:80, based on the total weight of the (A) polyolefin and the (B) siliceous earth.

The polyolefin may blended with one or more polymers. Accordingly, the curable composition of the present disclosure (as well as the crosslinked polymer composition comprising the reaction product of the curable composition) may further comprise one or more polymers, including but not limited to unsaturated polyolefins (another EPDM, polybutadiene, etc.), saturated polyolefins (PE, PP, ethylene/alpha-olefin interpolymers, propylene/alpha-olefin interpolymers, olefin block copolymers, etc.), other elastomers (SBCs, PVC, EVA, etc.) and other engineering thermoplastics (styrenics, polyamides, polyesters, etc.).

In certain embodiments, the polyolefin is not blended with other polymers. In certain embodiments, the curable composition is absent (or does not comprise of) any polymers other than the (A) polyolefin.

The curable composition of the present disclosure may be cured to form a crosslinked polymer composition. The crosslinked polymer composition of the present disclosure is the reaction product of the curable composition.

The curable composition or the crosslinked polymer composition may have the following properties in accordance with the methods disclosed herein or similar methods, where volume resistivity is at room temperature. In certain embodiments, the curable composition or the crosslinked polymer composition has a volume resistivity of greater than 1.0E+15 ohm·cm, or greater than or equal to 3.0E+15 ohm·cm, or greater than or equal to 5.0E+15 ohm·cm, or greater than or equal to 7.0E+15 ohm·cm, or greater than or equal to 1.0E+16 ohm·cm, or greater than or equal to 2.0E+16 ohm·cm, or greater than or equal to 4.0E+16 ohm·cm, or greater than or equal to 5.0E+16 ohm·cm, or greater than or equal to 7.0E+16 ohm·cm, or greater than or equal to 1.0E+17 ohm·cm, or greater than or equal to 5.0E+17 ohm·cm, or greater than or equal to 1.0E+18 ohm·cm, or greater than or equal to 1.0E+19 ohm·cm.

In certain embodiments, the curable composition or the crosslinked polymer composition has a volume resistivity from greater than 1.0E+15 ohm·cm to 1.0E+19 ohm·cm, or from greater than 1.0E+15 ohm·cm to 5.0E+18 ohm·cm, or from greater than 1.0E+15 ohm·cm to 1.0E+18 ohm·cm, or from greater than 1.0E+15 ohm·cm to 5.0E+17 ohm·cm, or from greater than 3.0E+15 ohm·cm to 5.0E+17 ohm·cm, or from greater than 3.0E+15 ohm·cm to 2.0E+17 ohm·cm.

Each of the curable composition and the crosslinked polymer composition may have any combination of embodiments described herein.

Articles and Applications

The curable composition or crosslinked polymer composition of the present disclosure may be used to prepare articles by any one of a number of conventional processes and apparatuses. Illustrative processes include, but are not limited to, extrusion, calendaring, compression molding, and other typical thermoset material forming process. For example, articles can be prepared by extrusion, extrusion followed by additional thermal treatment, low pressure molding, compression molding, and the like.

Articles prepared with the curable composition or crosslinked polymer composition of the present disclosure include, but are not limited to, sheets, films, molded goods, fibers, and extruded parts. Additional articles include, but are not limited to, soft touch goods, automotive parts, adhesives, piping, weather strips, belts, hoses, building profiles, wire and cable jacketing and components, flooring materials, gaskets and profiles, tires and tire components, computer parts, building materials, coatings, woodworking, photovoltaic articles, and footwear components. A person of ordinary skill in the art can readily augment this list without undue experimentation.

The article may have the following VR properties in accordance with the methods disclosed herein and similar methods. In certain embodiments, an article comprising (or made from) the curable composition or the crosslinked polymer composition has a volume resistivity of greater than 1.0E+15 ohm·cm, or greater than or equal to 3.0E+15 ohm·cm, or greater than or equal to 3.45E+15 ohm·cm, or greater than or equal to 5.0E+15 ohm·cm, or greater than or equal to 7.0E+15 ohm·cm, or greater than or equal to 1.0E+16 ohm·cm, or greater than or equal to 2.0E+16 ohm·cm, or greater than or equal to 4.0E+16 ohm·cm, or greater than or equal to 5.0E+16 ohm·cm, or greater than or equal to 7.0E+16 ohm·cm, or greater than or equal to 1.0E+17 ohm·cm, or greater than or equal to 1.25E+17 ohm·cm, or greater than or equal to 5.0E+17 ohm·cm, or greater than or equal to 1.0E+18 ohm·cm, or greater than or equal to 5.0E+18 ohm·cm, or greater than or equal to 1.0E+19 ohm·cm.

In certain embodiments, an article comprising (or made from) the curable composition or the crosslinked polymer composition has a volume resistivity from greater than 1.0E+15 ohm·cm to 1.0E+19 ohm·cm, or from greater than 1.0E+15 ohm·cm to 5.0E+18 ohm·cm, or from greater than 1.0E+15 ohm·cm to 1.0E+18 ohm·cm, or from greater than 1.0E+15 ohm·cm to 5.0E+17 ohm·cm, or from greater than 3.0E+15 ohm·cm to 5.0E+17 ohm·cm, or from greater than or equal to 3.0E+15 ohm·cm to 2.0E+17 ohm·cm.

The article comprising (or made from) the curable composition or the crosslinked polymer composition may be any combination of embodiments disclosed herein.

Specific embodiments of the present disclosure include but are not limited to the following:

1. A curable composition comprising: (A) a polyolefin; (B) siliceous earth; (C) a crosslinking agent; (D) a crosslinking co-agent; and, optionally, (E) an additive component comprising a metal oxide and an antioxidant.

2. The curable composition of embodiment 1, comprising:
   (A) from 30 wt % to 95 wt %, or from 40 wt % to 95 wt %, or from 50 wt % to 85 wt %, or from 55 wt % to 75 wt % of the polyolefin, based on the total weight of the curable composition;
   (B) from 0.1 wt % to 55 wt % or from 1 wt % to 50 wt %, or from 10 wt % to 40 wt % or from 15 wt % to 35 wt %, or from 20 wt % to 35 wt % of the siliceous earth, based on the total weight of the curable composition;
   (C) from 0.01 wt % to 10 wt % or from 0.1 wt % to 10 wt %, or from 0.5 wt % to 8 wt %, or from 1 wt % to 5 wt % or from 2 wt % to 4 wt % of the crosslinking agent, based on the total weight of the curable composition;
   (D) from 0.01 wt % to 5 wt %, or from 0.05 wt % to 3 wt %, or from 0.1 wt % to 1 wt % of the crosslinking co-agent, based on the total weight of the curable composition; and (E) from 0 wt % to 20 wt %, or from 0.01 wt % to 20 wt %, or from 0.01 wt % to 15 wt %, or from 0.01 wt % to 10 wt % or from 0.1 wt % to 10 wt % or from 1 wt % to 10 wt %, or from 1 wt % to 8 wt %, or from 2 wt % to 6 wt % of the additive component, based on the total weight of the curable composition.

3. The curable composition of embodiment 1 or 2, wherein the polyolefin is selected from the group consisting of an ethylene/alpha-olefin/diene interpolymer, an ethylene/alpha-olefin copolymer, a propylene/alpha-olefin copolymer, and an ethylene/alpha-olefin multi-block interpolymer.

4. The curable composition of any of the previous embodiments, wherein the alpha-olefin is selected from the group consisting of ethylene, propylene, 1-butene, 4-methyl-1-pentene, 1-hexene, 1-octene, 1-decene, 1-dodecene, 1-tetradecene, 1-hexadecene, and 1-octadecene.

5. The curable composition of any of the previous embodiments, wherein the polyolefin is an ethylene/alpha-olefin/diene interpolymer.

6. The curable composition of any of the previous embodiments, wherein the polyolefin is an ethylene/propylene/diene interpolymer.

7. The curable composition of any of the previous embodiments, wherein the polyolefin is an ethylene/propylene/ENB interpolymer.

8. The curable composition of any of the previous embodiments, wherein the polyolefin comprises vanadium in an amount of less than or equal to 0.4 ppm or less than or equal to 0.3 ppm.

9. The curable composition of any of the previous embodiments, wherein the polyolefin comprises a Group 4 metal in an amount of greater than or equal to 0.3 ppm, or greater than or equal to 0.4 ppm, or greater than or equal to 0.5 ppm, or greater than or equal to 0.6 ppm.

10. The curable composition of any of the previous embodiments, wherein the polyolefin comprises titanium in an amount of greater than or equal to 0.3 ppm, or greater than or equal to 0.4 ppm, or greater than or equal to 0.5 ppm, or greater than or equal to 0.6 ppm.

11. The curable composition of any of the previous embodiments, wherein the polyolefin comprises zirconium in an amount of greater than or equal to 0.3 ppm, or greater than or equal to 0.4 ppm, or greater than or equal to 0.5 ppm, or greater than or equal to 0.6 ppm.

12. The curable composition of any of the previous embodiments, wherein the polyolefin comprises hafnium in an amount of greater than or equal 0.3 ppm, or greater than or equal to 0.4 ppm, or greater than or equal to 0.5 ppm, or greater than or equal to 0.6 ppm.

13. The curable composition of any of the previous embodiments, wherein the polyolefin comprises titanium, zirconium, and/or hafnium in an amount of greater than or equal 0.3 ppm, or greater than or equal to 0.4 ppm, or greater than or equal to 0.5 ppm, or greater than or equal to 0.6 ppm.

14. The curable composition of any of the previous embodiments, wherein the polyolefin has, in accordance with ASTM D1646, a Mooney viscosity (ML 1+4 at 125° C.) from greater than 0 to 100 MU, or from 5 MU to 100 MU, or from 15 MU to 100 MU, or from 15 MU to 99 MU, or from 15 MU to 90 MU or from 15 MU to 80 MU or from 15 MU to 70 MU or from 15 MU to 60 MU or from 15 MU to 50 MU, or from 18 MU to 45 MU, or from 18 MU to 40 MU.

15. The curable composition of any of the previous embodiments, wherein the ethylene/alpha-olefin/diene interpolymer has, in accordance with ASTM D792, Method B, a density from 0.850 g/cc to 0.920 g/cc, or from 0.860 g/cc to 0.910 g/cc, or from 0.860 g/cc to 0.900 g/cc, or from 0.860 g/cc to 0.890 g/cc, or from 0.860 g/cc to 0.880 g/cc, or from 0.870 to 0.880 g/cc.

16. The curable composition of any of the previous embodiments, wherein the polyolefin comprises from 40 to 80 wt %, or from 50 to 80 wt %, or from 55 to 70 wt % of polymerized ethylene.

17. The curable composition of any of the previous embodiments, wherein the polyolefin comprises from zero to 10 wt %, or from 0.5 wt % to 9 wt %, or from 0.5 wt % to 8.5 wt % of polymerized diene.

18. The curable composition of any of the previous embodiments, wherein the polyolefin has a molecular weight distribution (MWD or Mw/Mn) from 1 to 7, or from 1 to 5, or from 1.5 to 5, or from 2 to 4.

19. The curable composition of any of the previous embodiments, wherein the siliceous earth is Classic Neuburg Siliceous Earth.

20. The curable composition of embodiment 19, wherein the siliceous earth has a particle size distribution (D50) from 1.5 to 4.

21. The curable composition of any of the previous embodiments, wherein the crosslinking agent is an organic peroxide.

22. The curable composition of embodiment 21, wherein the organic peroxide is selected from the group consisting of: di-2-t-butylperoxy isopropyl benzene, tert-Butylperoxy 2-ethylhexyl carbonate, dicumyl peroxide, lauryl peroxide, benzoyl peroxide, tertiary butyl perbenzoate, di(tertiary-butyl) peroxide, cumene hydroperoxide, 2,5-dimethyl-2,5-di(t-butyl-peroxy) hexyne-3,2-5-di-methyl-2,5-di(t-butyl-peroxy)hexane, tertiary butyl hydroperoxide, isopropyl percarbonate, alpha,alpha'-bis(tertiary-butylperoxy)diisopropylbenzene, 1,1-bis(t-butylperoxy)-3,5,5-trimethyl cyclohexane, 2,5-dimethyl-2,5-dihydroxyperoxide, t-butyl-cumylperoxide, alpha,alpha'-bis(t-butylperoxy)-p-diisopropyl benzene, and combinations thereof.

23. The curable composition of any of the previous embodiments, wherein the crosslinking co-agent is selected from the group consisting of triallyl isocyanurate, triaryl cyanurate, triallyl phosphate, trimethylolpropane trimethacrylate, and combinations thereof.

24. The curable composition of any of the previous embodiments, wherein the additive component comprises a metal oxide and an antioxidant.

25. The curable composition of any of the previous embodiments, wherein the curable composition has a volume resistivity of greater than 1.0E+15 ohm·cm, or greater than or equal to 3.0E+15 ohm·cm, or greater than or equal to 5.0E+15 ohm·cm, or greater than or equal to 7.0E+15 ohm·cm, or greater than or equal to 1.0E+16 ohm·cm, or greater than or equal to 2.0E+16 ohm·cm, or greater than or equal to 4.0E+16 ohm·cm, or greater than or equal to 5.0E+16 ohm·cm, or greater than or equal to 7.0E+16 ohm·cm, or greater than or equal to 1.0E+17 ohm·cm, or greater than or equal to 5.0E+17 ohm·cm, or greater than or equal to 1.0E+18 ohm·cm, or greater than or equal to 5.0E+18 ohm·cm, or greater than or equal to 1.0E+19 ohm·cm.

26. The curable composition of any of the previous embodiments, wherein the curable composition has a volume resistivity from greater than 1.0E+15 ohm·cm to 1.0E+19 ohm·cm, or from greater than 1.0E+15 ohm·cm to 5.0E+18 ohm·cm, or from greater than 1.0E+15 ohm·cm to 1.0E+18 ohm·cm, or from greater than 1.0E+15 ohm·cm to 5.0E+17 ohm·cm, or from greater than 3.0E+15 ohm·cm to 5.0E+17 ohm·cm, or from greater than or equal to 3.0+15 ohm·cm to 3.0E+17 ohm·cm, or from greater than or equal to 3.0E+15 ohm·cm to 2.0E+17 ohm·cm.

27. A crosslinked polymer composition comprising the curable composition of any of the previous embodiments.
28. A crosslinked polymer composition that is the reaction product of the curable composition of any of embodiments 1-26.
29. A crosslinked polymer composition comprising the reaction product of the curable composition of any of embodiments 1-26.
30. The crosslinked polymer composition of any of embodiments 27-29, wherein the crosslinked polymer composition has a volume resistivity of greater than 1.0E+15 ohm·cm, or greater than or equal to 3.0E+15 ohm·cm or greater than or equal to 5.0E+15 ohm·cm, or greater than or equal to 7.0E+15 ohm·cm, or greater than or equal to 1.0E+16 ohm·cm, or greater than or equal to 2.0E+16 ohm·cm, or greater than or equal to 4.0E+16 ohm·cm, or greater than or equal to 5.0E+16 ohm·cm, or greater than or equal to 7.0E+16 ohm·cm, or greater than or equal to 1.0E+17 ohm·cm, or greater than or equal to 5.0E+17 ohm·cm, or greater than or equal to 1.0E+18 ohm·cm, or greater than or equal to 5.0E+18 ohm·cm, or greater than or equal to 1.0E+19 ohm·cm.
31. The crosslinked polymer composition of any of embodiments 27-30, wherein the crosslinked polymer composition has a volume resistivity from greater than 1.0E+15 ohm·cm to 1.0E+19 ohm·cm, or from greater than 1.0E+15 ohm·cm to 5.0E+18 ohm·cm, or from greater than 1.0E+15 ohm·cm to 1.0E+18 ohm·cm, or from greater than 1.0E+15 ohm·cm to 5.0E+17 ohm·cm, or from greater than 3.0E+15 ohm·cm to 5.0E+17 ohm·cm, or from greater than or equal to 3.0E+15 ohm·cm to 3.0E+17 ohm·cm, or from greater than or equal to 3.0E+15 ohm·cm to 2.0E+17 ohm·cm.
32. An article comprising the curable composition of any of embodiments 1-26.
33. An article made from the curable composition of any of embodiments 1-26.
34. An article comprising the crosslinked polymer composition of any of embodiments 27-31.
35. An article made from the crosslinked polymer composition of any of embodiments 27-31.
36. The article of any of embodiments 31-35, wherein the article has a volume resistivity of greater than 1.0E+15 ohm·cm, or greater than or equal to 3.0E+15 ohm·cm, or greater than or equal to 5.0E+15 ohm·cm, or greater than or equal to 7.0E+15 ohm·cm, or greater than or equal to 1.0E+16 ohm·cm, or greater than or equal to 2.0E+16 ohm·cm, or greater than or equal to 4.0E+16 ohm·cm, or greater than or equal to 5.0E+16 ohm·cm, or greater than or equal to 7.0E+16 ohm·cm, or greater than or equal to 1.0E+17 ohm·cmohm·cm, or greater than or equal to 5.0E+17 ohm·cm, or greater than or equal to 1.0E+18 ohm·cm, or greater than or equal to 5.0E+18 ohm·cm, or greater than or equal to 1.0E+19 ohm·cm.
37. The article of any of embodiments 31-36, wherein the article has a volume resistivity from greater than 1.0E+15 ohm·cm to 1.0E+19 ohm·cm, or from greater than 1.0E+15 ohm·cm to 5.0E+18 ohm·cm, or from greater than 1.0E+15 ohm·cm to 1.0E+18 ohm·cm, or from greater than 1.0E+15 ohm·cm to 5.0E+17 ohm·cm, or from greater than 3.0E+15 ohm·cm to 5.0E+17 ohm·cm, or from greater than or equal to 3.0E+15 ohm·cm to 3.0E+17 ohm·cm, or from greater than or equal to 3.0E+15 ohm·cm to 2.0E+17 ohm·cm.
38. The article of any of embodiments 31-37, wherein the article is a film.

EXAMPLES

Materials

The materials used in the following examples are described below.

NORDEL™ 3720P ("EPDM 1"): An ethylene propylene diene interpolymer (made via non-Z-N catalysts) available from The Dow Chemical Company having: a density of 0.880 g/cc (ASTM D792); a Mooney Viscosity (ML 1+4 at 125° C.) of 20 MU (ASTM D1646); an ethylene content of 70 wt % (ASTM D3900); and an ENB content of 0.6 wt % (ASTM D6047).

NORDEL™ 3722P ("EPDM 2"): An ethylene propylene diene interpolymer (made via non-Z-N catalysts) available from The Dow Chemical Company having: a density of 0.880 g/cc (ASTM D792); a Mooney Viscosity (ML 1+4 at 125° C.) of 18 MU (ASTM D1646); an ethylene content of 71 wt % (ASTM D3900); and an ENB content of 0.5 wt % (ASTM D6047).

NORDEL™ 4725P ("EPDM 3"): An ethylene propylene diene interpolymer (made via non-Z-N catalysts) available from The Dow Chemical Company having: a density of 0.880 g/cc (ASTM D792); a Mooney Viscosity (ML 1+4 at 125° C.) of 25 MU (ASTM D1646); an ethylene content of 70 wt % (ASTM D3900); and an ENB content of 4.9 wt % (ASTM D6047).

EPT™ 2060M ("EPDM 4"): An ethylene propylene diene interpolymer (made via non-Z-N catalysts) available from Mitsui Chemicals having: a Mooney Viscosity (ML 1+4 at 125° C.) of 40 MU (ASTM D1646); an ethylene content of 55 wt % (ASTM D3900); and an ENB content of 2.3 wt % (ASTM D6047).

KEP® 210 ("EPDM A"): A Ziegler-Natta catalyzed ethylene propylene diene interpolymer available from Kumho Polychem having: a density of 0.860 g/cc (ASTM D792); a Mooney Viscosity (ML 1+4 at 125° C.) of 23 MU (ASTM D1646); an ethylene content of 65 wt % (ASTM D3900); and an ENB content of 5.7% (ASTM D6047).

Vistalon™ 2504 ("EPDM B"): A Ziegler-Natta catalyzed ethylene propylene diene interpolymer available from ExxonMobil Chemical Company having: a Mooney Viscosity (ML 1+4 at 125° C.) of 25 MU (ASTM D1646); an ethylene content of 58 wt % (ASTM D3900); and an ENB content of 4.7 wt % (ASTM D6047).

Luperox® F40P ("Peroxide"): Di-2-t-butylperoxy isopropyl benzene (40% active content in calcium carbonate) available from Arkema.

SR 350 NS ("Coagent"): Trimethylolpropane trimethacrylate available from Sartomer Arkema Group.

Sillitin N85 ("Siliceous Earth 1"): Classic Neuburg Siliceous Earth available from Hoffman Mineral GmbH. A natural combination of corpuscular Neuburg silica and lamellar kaolinite: a loose mixture impossible to separate by physical methods; D50=4.0 μm.

Sillitin Z86 ("Siliceous Earth 2"): Classic Neuburg Siliceous Earth available from Hoffman Mineral GmbH. A natural combination of corpuscular Neuburg silica and lamellar kaolinite: a loose mixture impossible to separate by physical methods; D50=1.9 μm.

SIPERNAT® 622 LS ("Silica"): Precipitated silica with particle size D50 of 4.5 μm available from Evonik Industries AG.

Agerite® Resin D® ("Antioxidant"): Polymerized 1,2-dihydro-2,2,4-trimethylquinoline available from Vanderbilt Chemicals, LLC.

Zinc Oxide ("ZnO") available from Sinopharm Chemical Reagent Co., Ltd.

The VR and residual metal content of the neat resins of EPDM 1 to 4 and EPDM A and B were measured according to the methods described herein and presented in Table 1. "ND" means "not detectable," which indicates a measurement below the detection limit for that metal (0.3 ppm for Zr, 0.4 ppm for V and 0.8 ppm for Ti).

TABLE 1

|  | EPDM 1 | EPDM 2 | EPDM 3 | EPDM 4 | EPDM A | EPDM B |
|---|---|---|---|---|---|---|
| VR at RT (ohm · cm) | 5.75E+14 | 1.86E+15 | 1.30E+14 | 1.54E+14 | 2.55E+17 | 9.52E+16 |
| Vanadium (ppm) | ND | ND | ND | ND | 13.6 | 1.93 |
| Zirconium (ppm) | ND | 0.522 | 0.364 | ND | ND | ND |

Sample Preparation

Each of the comparative examples (CE1 to CE7) and inventive examples (IE1 to IE7) are prepared as described below and in accordance with the formulations of Tables 2 and 3.

EPDM was fed into a Brabender mixer at a set temperature of 100° C. with a rotor speed of 30 rpm. After around 2 minutes, the EPDM was homogeneously heated/melted. All the other components, including Siliceous Earth, were weighed and then gradually added into the chamber. 50 rpm was employed for another 3 minutes to disperse filler and various other additives. Final mixing was operated at the set temperature and a rotor speed of 40 rpm for 6 minutes, a lower rotor speed was used to control sharp increase of melt temperature and avoid scorch. The compound was collected and pressed into a flat pie for the following use.

Preparation of cured films: The compounds from Brabender mixing were compression molded into 0.5 mm films. The samples were pre-compressed and then degassed first, followed by the T90+6 min pressing process at 180° C. to insure the completely curing of the sample, followed by ramp down to room temperature.

Preparation of non-cured films: The compounds from Brabender mixing were preheated at 120° C. for 5 min, and then degassing followed by the 1 min pressing process at 120° C., followed by ramp down to room temperature. The film thickness is also 0.5 mm.

The VR and curing properties were measured and are presented in Tables 2 and 3.

TABLE 2

| Component | CE1 | CE2 | CE3 | CE4 | CE5 | CE6 | CE7 |
|---|---|---|---|---|---|---|---|
| Comparative Compositions (wt %) | | | | | | | |
| EPDM 2 | — | — | — | — | — | — | 58.30 |
| EPDM A | 58.30 | — | 70.67 | — | 58.30 | 58.30 | — |
| EPDM B | — | 58.30 | — | 70.67 | — | — | — |
| Siliceous Earth 1 | 35.0 | 35.0 | 21.20 | 21.20 | — | — | — |
| Siliceous Earth 2 | — | — | — | — | 35.0 | — | — |
| Silica | — | — | — | — | — | 35.0 | 35.0 |
| ZnO | 2.92 | 2.92 | 3.53 | 3.53 | 2.92 | 2.92 | 2.92 |
| Antioxidant | 0.87 | 0.87 | 1.06 | 1.06 | 0.87 | 0.87 | 0.87 |
| Peroxide | 2.33 | 2.33 | 2.83 | 2.83 | 2.33 | 2.33 | 2.33 |
| Coagent | 0.58 | 0.58 | 0.71 | 0.71 | 0.58 | 0.58 | 0.58 |
| Total (wt %) | 100 | 100 | 100 | 100 | 100 | 100 | 100 |
| Test Results | | | | | | | |
| MH/dNm | 18.80 | — | 14.37 | 17.96 | 17.30 | 49.03 | 48.10 |
| ts2/min | 0.61 | — | 0.78 | 0.70 | 0.68 | 0.36 | 0.25 |
| t90/min | 7.26 | — | 7.95 | 7.39 | 8.26 | 6.47 | 5.14 |
| VR at RT (ohm · cm) | 6.37E+16 | 4.64E+16 | 1.95E+17 | 2.15E+17 | 5.57E+16 | 3.15E+14 | 4.91E+14 |

TABLE 3

| Component | IE1 | IE2 | IE3 | IE4 | IE5 | IE6 | IE7 |
|---|---|---|---|---|---|---|---|
| Inventive Compositions (wt %) | | | | | | | |
| EPDM 1 | 58.30 | — | — | — | 70.67 | — | — |
| EPDM 2 | — | 58.30 | — | — | — | 70.67 | 58.30 |
| EPDM 3 | — | — | 58.30 | — | — | — | — |
| EPDM 4 | — | — | — | 58.30 | — | — | — |
| Siliceous Earth 1 | 35.0 | 35.0 | 35.0 | 35.0 | 21.20 | 21.20 | — |
| Siliceous Earth 2 | — | — | — | — | — | — | 35.0 |
| ZnO | 2.92 | 2.92 | 2.92 | 2.92 | 3.53 | 3.53 | 2.92 |

TABLE 3-continued

| Component | IE1 | IE2 | IE3 | IE4 | IE5 | IE6 | IE7 |
|---|---|---|---|---|---|---|---|
| Antioxidant | 0.87 | 0.87 | 0.87 | 0.87 | 1.06 | 1.06 | 0.87 |
| Peroxide | 2.33 | 2.33 | 2.33 | 2.33 | 2.83 | 2.83 | 2.33 |
| Coagent | 0.58 | 0.58 | 0.58 | 0.58 | 0.71 | 0.71 | 0.58 |
| Total (wt %) | 100 | 100 | 100 | 100 | 100 | 100 | 100 |
| Test Results | | | | | | | |
| MH/dNm | 25.02 | 21.10 | 30.35 | 27.35 | 15.48 | 14.95 | 20.51 |
| ts2/min | 0.58 | 0.64 | 0.54 | 0.52 | 0.82 | 0.86 | 0.76 |
| t90/min | 5.70 | 6.70 | 6.43 | 6.46 | 6.69 | 6.68 | 7.91 |
| VR at RT (ohm · cm) | 7.30E+15 | 4.15E+16 | 3.45E+15 | 2.93E+16 | 7.25E+15 | 1.25E+17 | 1.02E+17 |

As seen in Table 1, Z-N catalyzed polyolefins (EPDM A and B) have much higher VR (by 2-3 orders of magnitude) relative to polyolefins made by non-Z-N catalysts (EPDM 1-4).

As seen in the inventive examples IE1 to IE7, the compositions of the present disclosure including siliceous earth surprisingly and unexpectedly improve the VR by a significant amount. Indeed, the VR is improved in each of Inventive Examples 1-7 by more than one order of magnitude and even as much as two orders of magnitude. In contrast, as seen in CE1 to CE5, the same addition of siliceous earth to Z-N catalyzed polyolefins mostly decreased the VR of the polyolefin compositions. In addition, as seen in examples CE6 and CE7, it is shown that the addition of silica decreases the VR of the polyolefin compositions.

Beyond this, the curing properties of Inventive Examples 1-7 show that the addition of siliceous earth to improve VR does not negatively impact the curing properties. In summary, the compositions of the present disclosure can significantly improve the electrical properties (higher VR) of polyolefins, such as non-Z-N catalyzed EPDM, without harming curing properties, thereby enabling the use of such polyolefins in electrical related applications; further, such an improvement cannot be achieved with Z-N catalyzed polyolefin with the same addition of siliceous earth.

What is claimed is:

1. A curable composition comprising, based on the weight of the curable composition:
   from 40 wt % to 84 wt % of a non-Ziegler Natta catalyzed polyolefin having a Mooney viscosity ML 1+4 at 125° C. from 5 MU to 50 MU, in accordance with ASTM 1646;
   from 15 wt % to 40 wt % of siliceous earth;
   from 0.01 wt % to 8 wt % of a crosslinking agent consisting of one or more organic peroxides;
   from 0.01 wt % to 5 wt % of a crosslinking co-agent selected from the group consisting of: trimethylolpropane trimethacrylate (TRIM); triallyl cyanurate (TAC); triallyl-1,3,5-triazine-2,4,6(1H,3H,5H)-trione also known as triallyl isocyanurate (TAIC); hexaallyl melamine; triallyl phosphate (TAP); triallyl ortho formate; tetra-allyloxy-ethane; triallyl benzene-1,3,5-tricarboxylate; diallyl phthalate; diallyl terephthalate; zinc dimethacrylate; ethoxylated bisphenol A dimethacrylate, and combinations thereof; and
   from 0.01 wt % to 20 wt % of an additive component comprising of an oxide of calcium, zinc, iron, titanium, and aluminum and further comprising an antioxidant and wherein the curable composition has a volume resistivity of greater than 3.0E+15 ohm·cm.

2. The curable composition of claim 1, wherein the non-Ziegler Natta catalyzed polyolefin is selected from the group consisting of an ethylene/alpha-olefin/diene interpolymer, an ethylene/alpha-olefin interpolymer, an ethylene/alpha-olefin multi-block interpolymer, and a propylene/alpha-olefin interpolymer.

3. The curable composition of claim 1, wherein the non-Ziegler Natta catalyzed polyolefin is an ethylene/propylene/diene interpolymer.

4. The curable composition of claim 1, wherein the non-Ziegler Natta catalyzed polyolefin comprises vanadium in an amount of 0.4 ppm or less.

5. The curable composition of claim 1, wherein the non-Ziegler Natta catalyzed polyolefin comprises a Group 4 metal in an amount of 0.3 ppm or greater.

6. The curable composition of claim 1, wherein the polyolefin has a Mooney viscosity (ML 1+4 at 125° C.) from 10 MU to 40 MU, in accordance with ASTM D1646.

7. The curable composition of claim 1, wherein the curable composition has a volume resistivity of greater than 7.0E+15 ohm·cm.

8. A crosslinked polymer composition comprising the reaction product of the curable composition of claim 1.

9. The crosslinked polymer composition of claim 8, wherein the crosslinked polymer composition has a volume resistivity of greater than 5E+15 ohm·cm.

10. An article comprising the crosslinked polymer composition of claim 8.

11. An article comprising the curable composition of claim 1.

12. The article of claim 11, wherein the article has a volume resistivity of greater than 3.0E+15 ohm·cm.

* * * * *